United States Patent
Fu et al.

(10) Patent No.: US 10,161,222 B2
(45) Date of Patent: *Dec. 25, 2018

(54) COMPOSITIONS AND METHODS FOR SERVICING SUBTERRANEAN WELLS

(71) Applicant: Schlumberger Technology Corporation, Sugar Land, TX (US)

(72) Inventors: Diankui Fu, Kuala Lumpur (MY); Soo Hui Goh, Kuala Lumpur (MY)

(73) Assignee: Schlumberger Technology Corporation, Sugar Land, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/534,090

(22) Filed: Nov. 5, 2014

(65) Prior Publication Data

US 2016/0122616 A1    May 5, 2016

(51) Int. Cl.
| | |
|---|---|
| *E21B 37/06* | (2006.01) |
| *E21B 33/138* | (2006.01) |
| *C09K 8/524* | (2006.01) |
| *C09K 8/40* | (2006.01) |
| *C09K 8/467* | (2006.01) |

(52) U.S. Cl.
CPC .............. *E21B 37/06* (2013.01); *C09K 8/40* (2013.01); *C09K 8/467* (2013.01); *C09K 8/524* (2013.01); *E21B 33/138* (2013.01); *C09K 2208/08* (2013.01)

(58) Field of Classification Search
None
See application file for complete search history.

(56) References Cited

U.S. PATENT DOCUMENTS

| | | | | |
|---|---|---|---|---|
| 2,892,872 | A | * | 6/1959 | Forster ............... C07C 45/46 524/336 |
| 4,745,142 | A | * | 5/1988 | Ohwaki ............. C08G 63/672 252/301.24 |
| 6,016,872 | A | * | 1/2000 | Davis .................. C09K 8/035 166/312 |
| 6,419,019 | B1 | * | 7/2002 | Palmer .................. E21B 37/00 166/304 |
| 6,924,253 | B2 | | 8/2005 | Palmer et al. |
| 7,160,843 | B2 | | 1/2007 | Giard-Blanchard et al. |
| 7,704,926 | B2 | | 4/2010 | Zhou et al. |

(Continued)

FOREIGN PATENT DOCUMENTS

| | | |
|---|---|---|
| EP | 2175003 | 4/2010 |
| EP | 2594620 | 5/2013 |
| WO | 9937884 A1 | 7/1999 |

OTHER PUBLICATIONS

4DG Deep-Grooved Fiber; Accessed from website Sep. 2016; Fiber Innovation Technology Inc.; pp. 1-8; www.fitfibers.com.*

(Continued)

*Primary Examiner* — Anuradha Ahuja
(74) *Attorney, Agent, or Firm* — Andrea E. Tran

(57) ABSTRACT

Fluids containing surfactants and hydrophobic particles are effective media for cleaning non-aqueous fluids (NAFs) out of a subterranean wellbore. The fibers and surfactants are preferably added to a drilling fluid, a spacer fluid, a chemical wash, a cement slurry or combinations thereof. NAFs, such as an oil-base mud or a water-in-oil emulsion mud, are attracted to the fibers as the treatment fluid circulates in the wellbore.

12 Claims, 1 Drawing Sheet

(56) References Cited

U.S. PATENT DOCUMENTS

| | | | |
|---|---|---|---|
| 7,786,179 B2 | 8/2010 | Talingting-Pabalan et al. | |
| 2003/0212116 A1* | 11/2003 | Niki | A01N 43/10 |
| | | | 514/364 |
| 2004/0182577 A1* | 9/2004 | Chatterji | C09K 8/04 |
| | | | 166/305.1 |
| 2005/0175654 A1 | 8/2005 | Willberg et al. | |
| 2006/0157248 A1* | 7/2006 | Hoefer | C09K 8/12 |
| | | | 166/300 |
| 2006/0254770 A1 | 11/2006 | Hou | |
| 2006/0258545 A1* | 11/2006 | Chatterji | C09K 8/04 |
| | | | 507/219 |
| 2008/0200352 A1* | 8/2008 | Willberg | C09K 8/508 |
| | | | 507/219 |
| 2010/0263863 A1 | 10/2010 | Quintero et al. | |
| 2013/0048285 A1* | 2/2013 | Boulard | C09K 8/12 |
| | | | 166/293 |

OTHER PUBLICATIONS

B. Piot, G. Cuvillier, "Primary Cementing Techniques," in Nelson EB and Guillot D: Well Cementing—2nd Edition, Houston, Schlumberger (2006) pp. 459-501.

G. Daccord, D. Guillot, F. Nilsson, "Mud Removal," in Nelson EB and Guillot D: Well Cementing—2nd Edition, Houston, Schlumberger (2006) pp. 143-189.

International Search Report and Written Opinion issued in related International Application No. PCT/US2015/057911 dated Dec. 28, 2015, 9 pages.

International Search Report and Written Opinion issued in International Patent Appl. No. PCT/US2016/061469 dated Feb. 21, 2017; 11 pages.

\* cited by examiner

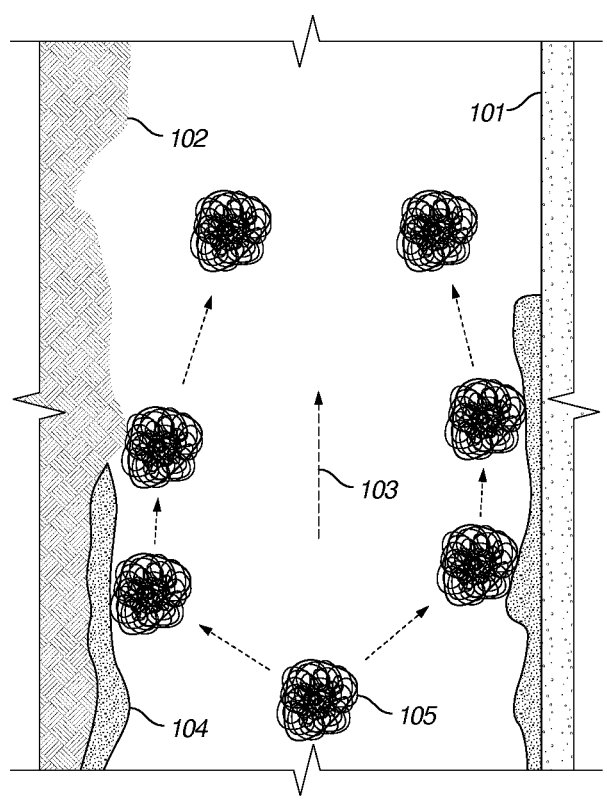

COMPOSITIONS AND METHODS FOR SERVICING SUBTERRANEAN WELLS

BACKGROUND

The statements in this section merely provide background information related to the present disclosure and may not constitute prior art.

This disclosure relates to compositions and methods for removing NAFs from a subterranean wellbore.

During the construction of subterranean wells, it is common, during and after drilling, to place a tubular body in the wellbore. The tubular body may comprise drillpipe, casing, liner, coiled tubing or combinations thereof. The purpose of the tubular body is to act as a conduit through which desirable fluids from the well may travel and be collected. The tubular body is normally secured in the well by a cement sheath. The cement sheath provides mechanical support and hydraulic isolation between the zones or layers that the well penetrates. The latter function is important because it prevents hydraulic communication between zones that may result in contamination. For example, the cement sheath blocks fluids from oil or gas zones from entering the water table and polluting drinking water. In addition, to optimize a well's production efficiency, it may be desirable to isolate, for example, a gas-producing zone from an oil-producing zone. The cement sheath achieves hydraulic isolation because of its low permeability. In addition, intimate bonding between the cement sheath and both the tubular body and borehole is necessary to prevent leaks.

The cement sheath is usually placed in the annular region between the outside of the tubular body and the subterranean borehole wall by pumping the cement slurry down the interior of the tubular body, out the bottom and up into the annulus. The cement slurry may also be placed by the "reverse cementing" method, whereby the slurry is pumped directly down into the annular space. During the cementing process, the cement slurry is frequently preceded by a spacer fluid or chemical wash to prevent commingling with drilling fluid in the wellbore. These fluids also help clean the tubular-body and formation surfaces, promoting better cement bonding and zonal isolation. The cement slurry may also be followed by a displacement fluid such as water, a brine or drilling fluid. This fluid usually resides inside the tubular body after the cementing process is complete. A complete description of the cementing process and the use of spacer fluids and chemical washes is presented in the following publications. Piot B and Cuvillier G: "Primary Cementing Techniques," in Nelson E B and Guillot D: *Well Cementing—2nd Edition*, Houston, Schlumberger (2006) 459-501. Daccord G, Guillot D and Nilsson F: "Mud Removal," in Nelson E B and Guillot D: *Well Cementing—2nd Edition*, Houston, Schlumberger (2006) 143-189.

Drilling-fluid removal and wellbore cleaning may be challenging when the well has been drilled with NAFs. In the art of well cementing, NAFs may be oil-base muds or water-in-oil emulsions. Conventionally, operators employ water-base spacer fluids or chemical washes comprising surfactants that render the fluids compatible with NAFs. In the context of well cementing, fluids are compatible when no negative rheological effects such as gelation occur upon their commingling. Such effects may hinder proper fluid displacement, leaving gelled fluid in the wellbore and reducing the likelihood of achieving proper zonal isolation. Ideally, the spacer fluid, chemical wash or both will completely remove the NAF and leave casing and formation surfaces in the annulus water wet. Water-wet surfaces may promote intimate bonding between the cement sheath and casing and formation surfaces.

SUMMARY

The present disclosure describes improved compositions for removing NAFs from wellbore and tubular-body surfaces. Aqueous fluids including spacer fluids, chemical washes, drilling fluids and cement slurries are provided that are compatible with NAFs and have the ability to remove them from a wellbore during a cementing treatment.

In an aspect, embodiments relate to compositions. The compositions comprise water, one or more surfactants and hydrophobic solids.

In a further aspect, embodiments relate to methods for cleaning a wellbore in a subterranean well whose surfaces are coated with a non-aqueous fluid (NAF). An aqueous treatment fluid is provided that comprises water, one or more surfactants and hydrophobic solids. The treatment fluid is circulated in the wellbore, then removed from the wellbore.

In yet a further aspect, embodiments relate to methods for cementing a subterranean well having a wellbore. An aqueous treatment fluid is provided that comprises water, one or more surfactants and hydrophobic solids. The treatment fluid is circulated in the wellbore, then removed from the wellbore. A cement slurry is then provided and placed in the well.

This summary is provided to introduce a selection of concepts that are further described below in the detailed description. This summary is not intended to identify key or essential features of the claimed subject matter, nor is it intended to be used as an aid in limiting the scope of the claimed subject matter.

BRIEF DESCRIPTION OF THE DRAWINGS

FIG. 1 shows a diagram illustrating the ability of hydrophobic fibers and surfactants to remove NAFs from casing and formation surfaces in a wellbore.

DETAILED DESCRIPTION

At the outset, it should be noted that in the development of any such actual embodiment, numerous implementation-specific decisions must be made to achieve the developer's specific goals, such as compliance with system related and business related constraints, which will vary from one implementation to another. Moreover, it will be appreciated that such a development effort might be complex and time consuming but would nevertheless be a routine undertaking for those of ordinary skill in the art having the benefit of this disclosure. The description and examples are presented solely for the purpose of illustrating the preferred embodiments should not be construed as a limitation to the scope and applicability of the disclosed embodiments. While the compositions of the present disclosure are described herein as comprising certain materials, it should be understood that the composition could optionally comprise two or more chemically different materials. In addition, the composition can also comprise some components other than the ones already cited.

Embodiments relate to compositions and methods for cleaning surfaces coated with a NAF. Such surfaces include a borehole in a subterranean well whose surfaces are coated with a NAF.

In an aspect, embodiments relate to compositions. The compositions comprise water, one or more surfactants and hydrophobic solids.

In a further aspect, embodiments relate to methods for cleaning a wellbore in a subterranean well whose surfaces are coated with a NAF. An aqueous treatment fluid is provided that comprises water, one or more surfactants and hydrophobic solids. The treatment fluid is circulated in the wellbore, then removed from the wellbore. The surfaces may comprise the borehole wall, tubular body surfaces or both. The circulation of the treatment fluid may remove the NAF, filter cake or both from the tubular body and borehole-wall surfaces, preferably leaving them water wet. The tubular body may be drill pipe, casing or tubing or combinations thereof.

In yet a further aspect, embodiments relate to methods for cementing a subterranean well having a wellbore. An aqueous treatment fluid is provided that comprises water, one or more surfactants and hydrophobic solids. The treatment fluid is circulated in the wellbore, then removed from the wellbore. A cement slurry is then provided and placed in the well.

The surfaces may comprise the borehole wall, tubular body surfaces or both. The circulation of the treatment fluid may remove the NAF, filter cake or both from the tubular body and borehole-wall surfaces, preferably leaving them water wet. The tubular body may be drill pipe, casing or tubing or combinations thereof.

The cement slurry may comprise portland cement, calcium aluminate cement, lime/silica mixtures, fly ash, blast furnace slag, zeolites, geopolymers or chemically bonded phosphate ceramics or combinations thereof. The cement slurry may further comprise additives comprising accelerators, retarders, extenders, weighting agents, fluid-loss additives, dispersants, nitrogen, air, gas generating agents, antifoam agents or lost circulation agents or combinations thereof.

For all aspects, the hydrophobic solids may comprise polyester fibers, polyalkene fibers or polyamide fibers or combinations thereof. The polyester fibers may be derived from polylactic acid.

For all aspects, the fibers may have a diameter larger than 1 micron but smaller than 50 microns, or smaller than 40 microns, or smaller than 30 microns. Specifically, for all aspects, the fibers may have a diameter between 1 micron and 50 microns, or 5 microns and 30 microns or 10 microns and 15 microns. The fibers may have a length longer than 1 mm but shorter than 30 mm, or 20 mm, or 10 mm. Specifically, for all aspects, the fibers may have a length between 2 mm and 20 mm, or 4 mm and 12 mm or 6 mm and 8 mm. The fibers may be present at a concentration between 0.6 kg/m$^3$ and 14 kg/m$^3$, or 1.2 kg/m$^3$ and 10 kg/m$^3$ or 3 kg/m$^3$ and 8 kg/m$^3$.

For all aspects, the fibers may be crimped. For this disclosure, crimps are defined as undulations, waves or a succession of bends, curls and waves in a fiber strand. The crimps may occur naturally, mechanically or chemically. Crimp has many characteristics, among which are its amplitude, frequency, index and type. For this disclosure, crimp is characterized by a change in the directional rotation of a line tangent to the fiber as the point of tangent progresses along the fiber. Two changes in rotation constitute one unit of crimp. Crimp frequency is the number of crimps or waves per unit length of extended or straightened fiber. Another parameter is the crimping ratio, K1 (Eq. 1).

$$K1 = \frac{L_v - L_k}{L_v} \times 100 \qquad \text{(Eq. 1)}$$

where Lk is the length of the crimped fiber in the relaxed, released state; and Lv is the length of the same fiber in the stretched state (i.e., the fiber is practically rectilinear without any bends).

For this disclosure, the fibers may have a crimp frequency between 1/cm and 6/cm, or 1/cm and 5/cm or 1/cm and 4/cm. The K1 value may be between 2% and 15%, or between 2% and 10% or between 2% and 6%.

For all aspects, the surfactants may comprise anionic surfactants, cationic surfactants, nonionic surfactants or zwitterionic surfactants or combinations thereof. The anionic surfactants may comprise sulfates, sulfonates, phosphates or carboxylates or combinations thereof. The anionic surfactants may comprise ammonium lauryl sulfate, sodium lauryl sulfate, sodium laureth sulfate, sodium myreth sulfate, dioctyl sodium sulfosuccinate, perfluorooctane sulfoantes, perfluorobutanesulfonates, alkylbenzene sulfonates, alkylaryl ether phosphates, alkyl ether phosphates, alkyl carboxylates, sarcosinates, perfluorononanoates, or perfluorooctanoates or combinations thereof. The cationic surfactants may comprise primary, secondary or tertiary amines, or quaternary ammonium salts or combinations thereof. The nonionic surfactants may comprise long chain alcohols, ethoxylated alcohols, polyoxyethylene glycol alkyl ethers, polyoxypropylene glycol alkyl ethers, glucoside alkyl ethers, polyoxyethylene glycol octylphenol ethers, polyoxyethylene glycol alklyphenol ethers, glycerol alkyl esters, polyoxyethylene glycol sorbitan alkyl esters, sorbitan alkyl esters, cocamide DEA, cocamide MEA, dodecyldimethylamine oxide, block copolymers of polyethylene glycol or polypropylene glycol, or polyethoxylated tallow amine or combinations thereof. The zwitterionic surfactants may comprise sultaines or betaines or combinations thereof.

One example of the method is illustrated in FIG. 1. Casing 101 is present in the wellbore, and a non-aqueous coating 104 is deposited on its surface. On the other side of the annular space, a non-aqueous coating 104 also is attached to the formation wall 102. The treatment fluid comprising surfactants and hydrophobic fibers 105 is flowing upward 103 in the annular space. The hydrophobic nature of the fibers and the presence of the surfactants cause the non-aqueous coating to be removed from the casing and formation surfaces as the treatment fluid travels up the annulus.

EXAMPLE

The following examples serve to further illustrate the invention.

The following test method was employed in all of the following examples. A rotor test was conducted to evaluate the ability of treatment-fluid compositions to remove NAF from casing surfaces. The test equipment was a Chan 35™ rotational rheometer, available from Chandler Engineering, Tulsa, Okla., USA. The rheometer was equipped with two cups—one with an 85-mm diameter for tests conducted at 25° C. and 55° C., and one with a 50-mm diameter for tests conducted at 85° C. A closed rotor, 73.30 mm long and 40.70 mm in diameter, was employed to simulate the casing surface and provide an evaluation of test repeatability. Both rotors had a sand blasted stainless-steel surfaces with an average roughness of 1.4 µm.

The NAF was an 80/20 oil/water emulsion obtained from a field location. The NAF density was 1420 kg/m³ (11.8 lbm/gal). The surfactant was EZEFLO™ Surfactant, a blend of ethoxylated alcohols available from Schlumberger, Houston, Tex., USA. The fiber was Short Cut PLA Staple, available from Fiber Innovation Technology, Johnson City, Tenn., USA. The NAF was sheared at 6000 RPM in a Silverson mixer for 30 minutes. The NAF was then transferred to one of the Chan 35™ rheometer cups. A test rotor was weighted ($w_0$) and then lowered into the NAF to a depth of 50 mm. The rotor was then rotated within the NAF for one minute at 100 RPM and then left to soak in the NAF for 10 minutes. Next, the rotor was removed from the NAF and left to drain for two minutes. The bottom of the rotor was wiped clean and then weighed ($w_1$). The rotor was then remounted on the rheometer and immersed in a cup containing the treatment fluid such that the NAF layer was just covered by the treatment fluid. The rotor was rotated for 10 minutes at 60 RPM. The rotor was then removed from the treatment fluid and left to drain for two minutes. The bottom of the rotor was wiped clean and weighed ($w_2$). The NAF removal efficiency R was then determined by Eq. 2.

$$R(\%) = \frac{w_1 - w_2}{w_1 - w_0} \times 100 \quad \text{(Eq. 2)}$$

The tests were repeated at least twice, and the results were averaged to obtain a final result. It is desirable to achieve an R value higher than 75%.

Example 1

Experiments were performed to evaluate the effect of fiber diameter on cleaning efficiency. The EZEFLO™ surfactant was present at a concentration of 23.8 vol % (1 gal/bbl). The fiber length was 6 mm, and the fiber concentration in the treatment fluid was 3.6 kg/m³ (1.25 lbm/bbl). The results are presented in Table 1. Fibers with diameters between 5 microns and 30 microns showed better cleaning efficiencies.

TABLE 1

Impact of fiber diameter on cleaning efficiency.

| Fiber Diameter (micron) | R (%) |
| --- | --- |
| 12 | 81.98 |
| 20 | 83.56 |
| 40 | 42.76 |

Example 2

Experiments were performed to evaluate the fiber geometry (i.e., straight or crimped) on cleaning efficiency. The EZEFLO™ surfactant was present at a concentration of 23.8 vol % (1 gal/bbl). The fiber length was 6 mm, and the fiber concentration in the treatment fluid was 3.6 kg/m³ (1.25 lbm/bbl). The results are presented in Table 2.

TABLE 2

Impact of fiber geometry on cleaning efficiency.

| Fiber Shape | R (%) |
| --- | --- |
| Straight | 81.98 |
| Crimped (<4 crimps/cm; K1 < 6%) | 95.52 |

Example 3

Experiments were performed to determine the effect of fiber concentration on cleaning efficiency. The EZEFLO™ surfactant was present at a concentration of 23.8 vol % (1 gal/bbl). The results are presented in Table 3. Fibers at concentrations above 3 kg/m³ showed better cleaning efficiencies. The upper limit of the fiber concentration can be adjusted according to the fluid design, but in general less than 10 kg/m³.

TABLE 3

Impact of fiber concentration on cleaning efficiency.

| Fiber Concentration (kg/m³ [lbm/bbl]) | R (%) |
| --- | --- |
| 1.4 [0.5] | 46.1 |
| 4.3 [1.25] | 86.3 |
| 7.1 [2.5] | 90.5 |

Although only a few example embodiments have been described in detail above, those skilled in the art will readily appreciate that many modifications are possible in the example embodiments without materially departing from this invention. Accordingly, all such modifications are intended to be included within the scope of this disclosure as defined in the following claims.

The invention claimed is:

1. A method for cleaning a wellbore in a subterranean well whose surfaces are coated with a non-aqueous fluid (NAF), comprising:
   (i) providing an aqueous treatment fluid comprising water, one or more surfactants and hydrophobic solids;
   (ii) circulating the treatment fluid in the wellbore; and
   (iii) removing the treatment fluid from the wellbore;
   wherein the hydrophobic solids are crimped fibers with a fiber length Lk in a relaxed state and a fiber length Lv in a stretched state, having a crimping ratio K1 that is between 2% and 15%, wherein, for each fiber, crimping is characterized by a change in a directional rotation of a line tangent to the fiber as a point of tangent progresses along the fiber, wherein K1 is defined by the following equation:

$$K1 = \frac{Lv - Lk}{Lv} \times 100.$$

2. The method of claim 1, wherein the crimped fibers comprise polyester fibers, polyalkene fibers or polyamide fibers or combinations thereof.

3. The method of claim 2, wherein the fibers comprise polyester fibers, and the polyester fibers are derived from polylactic acid.

4. The method of claim 1 wherein the fibers have a diameter between 1 micron and 50 microns, and the fiber length Lk between 2 mm and 20 mm.

5. The method of claim 1, wherein the one or more surfactants comprise anionic, cationic, nonionic or zwitterionic surfactants or combinations thereof.

6. The method of claim 1, wherein the aqueous treatment fluid comprises a drilling fluid, a spacer fluid, a chemical wash, or a cement slurry, or combinations thereof.

7. A method for cementing a subterranean well having a wellbore, comprising:
   (i) providing an aqueous treatment fluid comprising water, one or more surfactants and hydrophobic solids;
   (ii) circulating the treatment fluid in the wellbore;
   (iii) removing the treatment fluid from the wellbore;
   (iv) providing a cement slurry; and
   (v) placing the slurry in the well;
   wherein the hydrophobic solids are crimped fibers with a fiber length Lk in a relaxed state and a fiber length Lv in a stretched state, having a crimping ratio K1 that is between 2% and 15%, wherein, for each fiber, crimping is characterized by a change in a directional rotation of a line tangent to the fiber as a point of tangent progresses along the fiber, wherein K1 is defined by the following equation:

$$K1 = \frac{Lv - Lk}{Lv} \times 100.$$

8. The method of claim 7, wherein the crimped fibers comprise polyester fibers, polyalkene fibers or polyamide fibers or combinations thereof.

9. The method of claim 8, wherein the fibers comprise polyester fibers, and the polyester fibers are derived from polylactic acid.

10. The method of claim 7 wherein the fibers have a diameter between 1 micron and 50 microns, and the fiber length Lk between 2 mm and 20 mm.

11. The method of claim 7, wherein the one or more surfactants comprise anionic, cationic or zwitterionic surfactants or combinations thereof.

12. The method of claim 7, wherein the aqueous treatment fluid comprises a drilling fluid, a spacer fluid, a chemical wash, or a cement slurry, or combinations thereof.

* * * * *